(12) United States Patent
Sun

(10) Patent No.: US 8,281,580 B2
(45) Date of Patent: Oct. 9, 2012

(54) METHOD AND APPARATUS FOR MONITORING A PARTICULATE FILTER

(75) Inventor: Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 12/689,483

(22) Filed: Jan. 19, 2010

(65) Prior Publication Data

US 2011/0173955 A1 Jul. 21, 2011

(51) Int. Cl.
*F01N 3/00* (2006.01)
(52) U.S. Cl. ................ 60/311; 60/277; 60/274
(58) Field of Classification Search ........... 60/274, 60/277, 295, 297; 55/523, DIG. 30; 95/23; 96/422
See application file for complete search history.

(56) References Cited

U.S. PATENT DOCUMENTS

| 7,749,314 | B2 * | 7/2010 | Kondou .................. 96/421 |
| 2002/0196153 | A1 * | 12/2002 | Kinugawa et al. ........ 340/606 |
| 2005/0022519 | A1 * | 2/2005 | Shirakawa ............... 60/297 |
| 2005/0188686 | A1 * | 9/2005 | Saito et al. .............. 60/297 |
| 2007/0079607 | A1 * | 4/2007 | Suzuki et al. ............ 60/299 |
| 2007/0125075 | A1 * | 6/2007 | Zanini-Fisher et al. .... 60/297 |

* cited by examiner

*Primary Examiner* — Thomas E. Denion
*Assistant Examiner* — Patrick Maines

(57) ABSTRACT

A method to monitor a particulate filter includes determining an equivalent bypass area corresponding to a difference between a mass flowrate of an exhaust gas feedstream flowing to the particulate filter and a mass flowrate of the exhaust gas feedstream flowing through porous walls of a substrate.

13 Claims, 2 Drawing Sheets

US 8,281,580 B2

METHOD AND APPARATUS FOR MONITORING A PARTICULATE FILTER

TECHNICAL FIELD

This disclosure relates to exhaust aftertreatment systems, and more specifically to monitoring a particulate filter of an exhaust aftertreatment system.

BACKGROUND

The statements in this section merely provide background information related to the present disclosure and may not constitute prior art.

Known aftertreatment systems for managing and treating an exhaust gas feedstream include a particulate filter device that removes particulate matter, e.g., elemental carbon particles from the feedstream. Known applications for a particulate filter device include internal combustion engines operating lean of stoichiometry, including, e.g., compression-ignition (diesel) engines and lean-burn spark-ignition engines. Known particulate filter devices can experience faults in-service that affect ability of the device to remove particulate matter from the exhaust gas feedstream.

SUMMARY

A method to monitor a particulate filter having an inlet, an outlet, and a substrate having porous walls disposed intermediate the inlet and the outlet, includes determining a mass flowrate of an exhaust gas feedstream flowing to the particulate filter, determining a mass flowrate of the exhaust gas feedstream flowing through the porous walls of the substrate, determining an equivalent bypass area corresponding to a difference between the mass flowrate of the exhaust gas feedstream flowing to the particulate filter and the mass flowrate of the exhaust gas feedstream flowing through the porous walls of the substrate, and comparing the equivalent bypass area to a threshold.

BRIEF DESCRIPTION OF THE DRAWINGS

One or more embodiments will now be described, by way of example, with reference to the accompanying drawings, in which.

DETAILED DESCRIPTION

Figure 1:
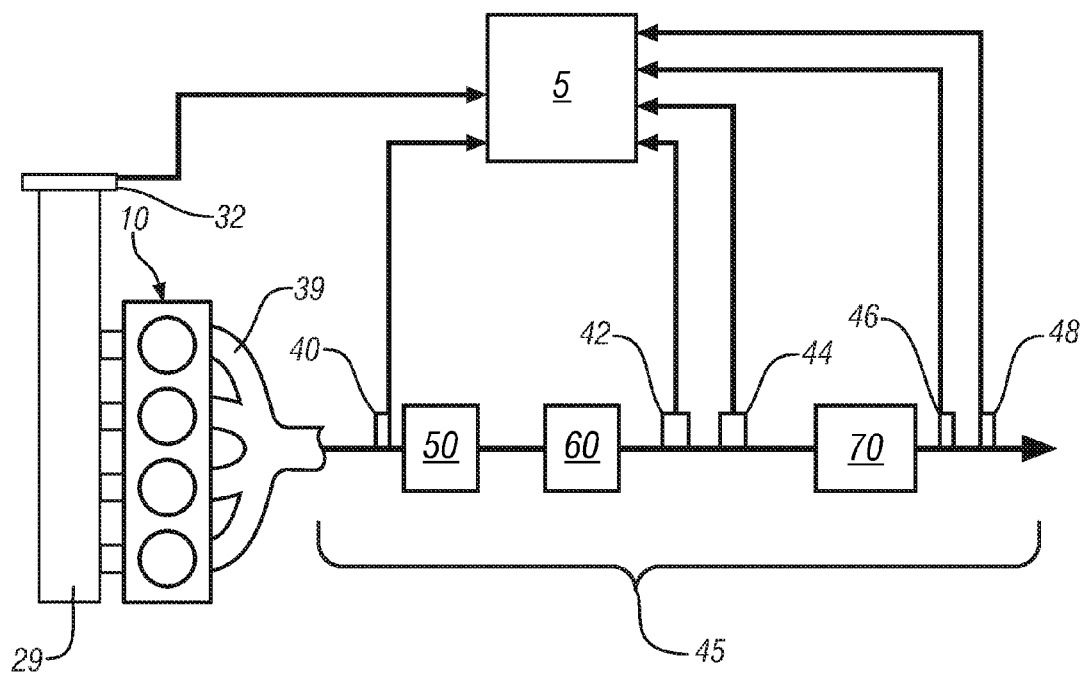
FIG. 1 is a schematic diagram of an exhaust aftertreatment system and an accompanying internal combustion engine, in accordance with the present disclosure.

Referring now to the drawings, wherein the showings are for the purpose of illustrating certain exemplary embodiments only and not for the purpose of limiting the same, FIG. 1 schematically illustrates an exhaust aftertreatment system 45 and an accompanying control system including control module 5 that has been constructed in accordance with an embodiment of the disclosure. The exhaust aftertreatment system 45 fluidly coupled to an exhaust manifold 39 of an internal combustion engine 10 in one embodiment, although the methods described herein are not so limited. Like numerals refer to like elements in the figures.

In one embodiment, the engine 10 comprises a multi-cylinder direct-injection four-stroke internal combustion engine that is operative lean of a stoichiometric air-fuel ratio to generate mechanical power that can be transmitted to a driveline (not shown). An air intake system channels intake air to an intake manifold 29 which directs and distributes the air into an intake passage to each combustion chamber of the engine 10. The air intake system comprises air flow ductwork and devices for monitoring and controlling the engine intake air flow. The devices preferably include a mass air flow sensor 32 for monitoring mass air flow through the engine 10 and intake air temperature. Other engine control devices, e.g., a throttle valve (not shown) can control air flow to the engine 10. The engine includes the exhaust manifold 39 that entrains exhaust gases from the engine 10 and channels the exhaust gas feedstream to the exhaust aftertreatment system 45.

The exhaust aftertreatment system 45 comprises at least one particulate filter 70 configured to remove particulate matter from the exhaust gas feedstream. In one embodiment, shown in FIG. 1, there is a first aftertreatment device 50 upstream of a second aftertreatment device 60. The particulate filter 70 is a third aftertreatment device placed downstream of the first and second aftertreatment devices 50 and 60. In one embodiment, the first aftertreatment device 50 comprises an oxidation catalyst and the second aftertreatment device 60 comprises a selective catalyst reduction device. The aftertreatment devices 50, 60, and 70 can be assembled into structures that are fluidly connected and assembled in an engine compartment and a vehicle underbody.

The exhaust aftertreatment system 45 is equipped with a plurality of sensing device(s) to monitor the exhaust gas feedstream. The sensing devices preferably include a wide-range air-fuel ratio sensor 40 operative to monitor the exhaust gas feedstream output from the exhaust manifold 39. A first temperature sensor 42 monitors temperature of the exhaust gas feedstream upstream of the particulate filter 70. A first pressure sensor 44 monitors pressure of the exhaust gas feedstream upstream of the particulate filter 70. A second pressure sensor 46 monitors pressure of the exhaust gas feedstream downstream of the particulate filter 70. A second temperature sensor 48 monitors temperature of the exhaust gas feedstream downstream of the particulate filter 70. Signal outputs of the sensing device(s) are monitored by the control module 5. The first and second temperature sensors 42 and 48 and the first and second pressure sensors 44 and 46 are shown as individual components in one embodiment, but the disclosure is not so limited. Furthermore, the first and second pressure sensors 44 and 46 can be replaced with a differential pressure sensing system comprising a single sensor (not shown) that is operative to monitor a pressure differential between an inlet 58 and an outlet 59 of the particulate filter 70 and operative to monitor inlet pressure to the particulate filter 70.

The control system includes a set of control algorithms executed in the control module 5. The control module 5 preferably comprises a general-purpose digital computer including a microprocessor or central processing unit, storage mediums comprising non-volatile memory including read only memory and electrically programmable read only memory, random access memory, a high speed clock, analog to digital conversion circuitry and digital to analog circuitry, and input/output circuitry and devices, and appropriate signal conditioning and buffer circuitry. The control module 5 executes the control algorithms to monitor the particulate filter 70. The control algorithms comprise resident program instructions and calibrations stored in the non-volatile memory that are executed to provide functions of the control system. The algorithms are executed during preset loop cycles such that each algorithm is executed at least once each loop cycle. Algorithms are executed by the central processing unit to monitor inputs from the aforementioned sensing devices and execute control and diagnostic routines, preferably including using preset calibrations. Loop cycles are executed at regular intervals, for example each 3.125, 6.25, 12.5, 25 and 100 milliseconds during ongoing engine operation. Alternatively, algorithms may be executed in response to occurrence of an event. The control system can be further capable to control operation of the engine 10 in one embodiment, including controlling operation at a preferred air-fuel ratio to achieve performance parameters related to operator requests, fuel consumption, emissions, and driveability, with the intake air flow controlled to achieve the preferred air-fuel ratio. Engine control can include periodically controlling engine operation to regenerate the particulate filter 70.

Figure 2:
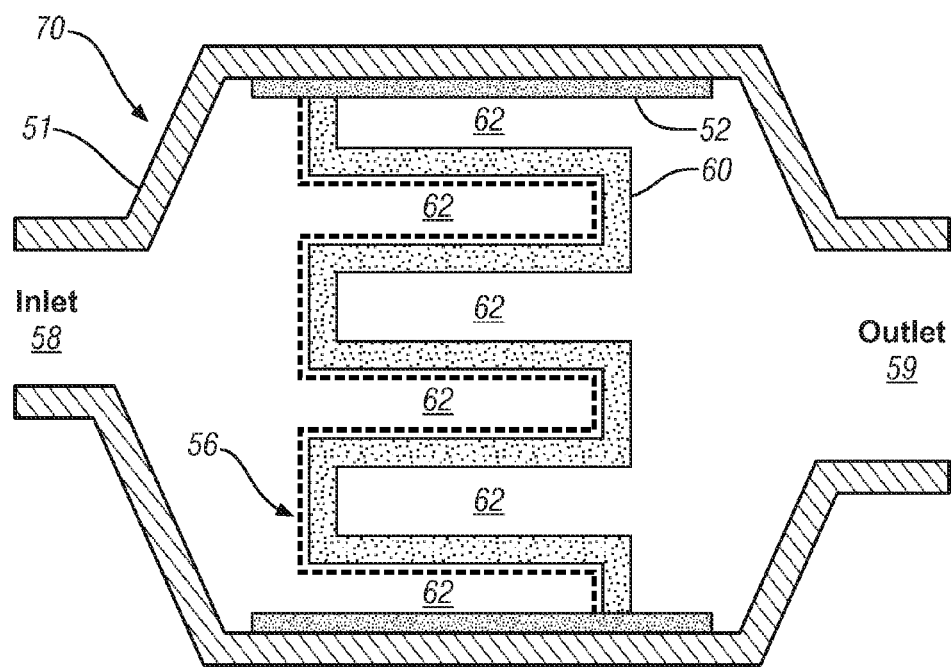
FIG. 2 is a schematic diagram of a particulate filter device for an exhaust aftertreatment system, in accordance with the present disclosure.

FIG. 2 schematically shows details of an embodiment of the particulate filter 70 configured to remove particulate matter from the exhaust gas feedstream. The aftertreatment device 70 includes a metallic container 51 having an inlet 58 and an outlet 59 that provides a structural housing for a substrate 60 disposed intermediate the inlet 58 and outlet 59. The inlet 58 fluidly connects to a fluidic outlet (not shown) of the second aftertreatment device 60. The outlet 59 fluidly connects to an exhaust pipe (not shown). Insulative support material 52 wraps around the substrate 60 and mechanically supports and secures the substrate 60 within the metallic container 51 intermediate the inlet 58 and an outlet 59. The insulative support material 52 also provides a sealing function to ensure that the exhaust gas feedstream flows through the substrate 60 from the inlet 58 to the outlet 59. The substrate 60 may be coated with a washcoat material 56, shown as applied on the inlet side of the substrate 60 in one embodiment. Preferred washcoat materials can include an alumina-based washcoat including, e.g., platinum, palladium, rhodium, and cerium.

The substrate 60 preferably has a honeycomb structure formed from extruded cordierite with a multiplicity of parallel flow passages 62 formed parallel to an axis between the inlet 58 and the outlet 59. Walls of the substrate 60 formed between the flow passages 62 by the extruded cordierite are porous. Each of the flow passages 62 is preferably closed at one end. Preferably, adjacent flow passages 62 are alternately closed at opposite inlet 58 and outlet 59. The alternately closed flow passages 62 cause the exhaust gas feedstream to flow through the porous walls of the substrate 60 as exhaust gas flows from the inlet 58 to the outlet 59 due to the pressure differential in the exhaust gas feedstream between the inlet 58 and the outlet 59 during engine operation. Flow of the exhaust gas feedstream through the porous walls of the substrate 60 serves to filter or strip particulate matter out of the exhaust gas feedstream and bring the exhaust gas feedstream in close proximity to the washcoat. Alternatively other filtering substrates including foams can be used in place of the substrate 60 having the wall-flow design described herein.

Figure 3:
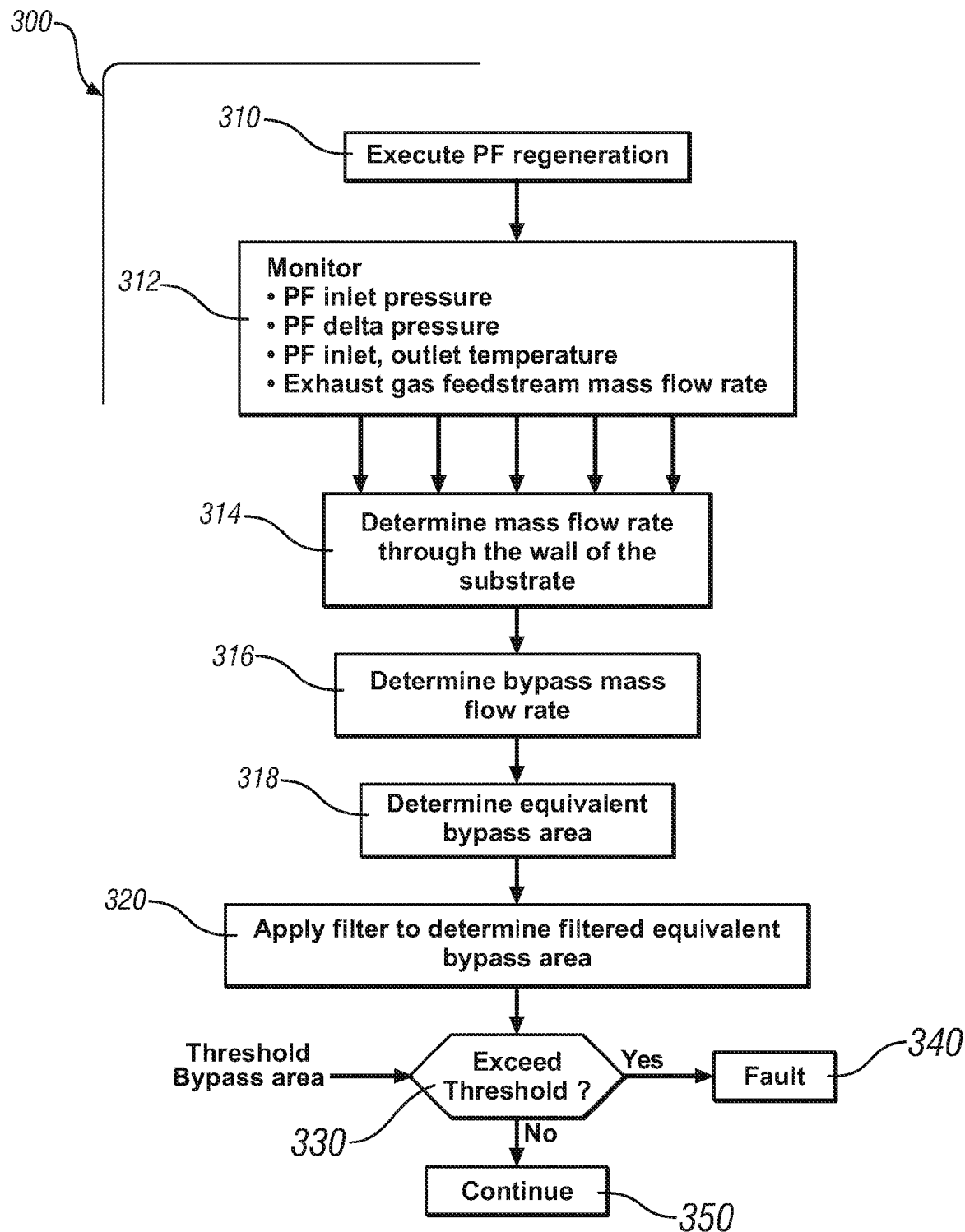
FIG. 3 is a flowchart, in accordance with the present disclosure.

FIG. 3 shows a flowchart (300) for monitoring the particulate filter 70 to determine efficacy of the particulate filter 70 including monitoring structural integrity thereof. Monitoring the particulate filter 70 preferably includes initially executing a regenerative operation (310) to purge the trapped particulate matter from the walls of the substrate 60. In the embodiment shown, the regenerative operation can include supplying excess hydrocarbons to the first aftertreatment device 50 comprising the oxidation catalyst to elevate the temperature of the exhaust gas feedstream. Subsequent to regenerating the particulate filter 70, parameters of the exhaust gas feedstream are monitored, including an inlet pressure to the particulate filter 70 and the pressure differential between the inlet 58 and the outlet 59 of the particulate filter 70. Temperatures of the exhaust gas feedstream preferably at the inlet 58 and the outlet 59 of the particulate filter 70 are monitored. A mass flow rate of the exhaust gas feedstream flowing to the particulate filter 70 is determined (312). The mass air flow sensor 32 can be used to determine mass flow of the exhaust gas feedstream $\dot{M}_{exh}$. Alternatively, engine operating conditions of speed and load can be used to determine the mass flow of the exhaust gas feedstream $\dot{M}_{exh}$.

A pressure differential across a clean or regenerated particulate filter 70 ('$\Delta P_{clean}$') can be expressed as follows:

$$\rho_{exh}\Delta P_{clean} = a\mu\left(1 + \frac{b}{k}\right)\dot{M}_{exh\_filtered} + c\dot{M}^2_{exh\_filtered} \qquad [1]$$

wherein a, b and c represent scalar values predetermined based upon a clean or regenerated particulate filter 70;
$\rho_{exh}$ represents exhaust gas density;
$\mu$ represents viscosity of the exhaust gas;
k represents permeability of the porous walls of the substrate 60 of the clean or regenerated particulate filter 70; and
$\dot{M}_{exh\_filtered}$ represents mass flow rate of the exhaust gas feedstream through the porous walls of the substrate 60 of the particulate filter 70.

The mass flow rate of the exhaust gas feedstream through the porous walls of the substrate 60 can be determined when the other factors of Eq. 1 are known or determined, preferably by solving Eq. 1 (314).

The other factors can be determined, including measuring $\Delta P_{clean}$ i.e., the pressure differential across a clean or regenerated particulate filter 70 using the first and second pressure sensing devices 44 and 46, and the exhaust gas density $\rho_{exh}$, the exhaust gas viscosity $\mu$, and the permeability k can be determined corresponding to the temperatures of the exhaust gas feedstream at the inlet 58 and the outlet 59 of the particulate filter 70. A particulate filter 70 is said to be clean when it is unused and subsequent to it having been regenerated as by the aforementioned regenerative action.

A mass flowrate of exhaust gas that bypasses the substrate 60 of the particulate filter 70 $\dot{M}_{dpf\_bypass}$ can be calculated (316). The mass flowrate of exhaust gas that bypasses the substrate 60 of the particulate filter 70 comprises a difference between the mass flow of the exhaust gas feedstream $\dot{M}_{exh}$ and the mass flow rate of the exhaust gas feedstream flowing through the porous walls of the substrate 60 of the particulate filter 70 $\dot{M}_{exh\_filtered}$ as follows.

$$\dot{M}_{dpf\_bypass} = \dot{M}_{exh} - \dot{M}_{exh\_filtered} \qquad [2]$$

An equivalent bypass area $A_{dpf\_bypass\_eff}$ can be calculated (318) using Bernoulli's equation for flow and solving for $\dot{M}_{dpf\_bypass}$ as follows.

$$\dot{M}_{dpf\_bypass} = A_{dpf\_bypass\_eff}\sqrt{2\rho_{exh}\Delta P_{clean}} \qquad [3]$$

The equivalent bypass area $A_{dpf\_bypass\_eff}$ is compared to a threshold bypass area $A_{dpf\_bypass\_threshold}$ to determine whether the threshold bypass area has been exceeded (330). The threshold bypass area $A_{dpf\_bypass\_threshold}$ can be predetermined in one embodiment based upon a predetermined relationship between an equivalent bypass area and a particulate matter emission level. A fault can be identified when the equivalent bypass area $A_{dpf\_bypass\_eff}$ exceeds the threshold bypass area $A_{dpf\_bypass\_threshold}$ (340).

In one embodiment, values for the equivalent bypass area $A_{dpf\_bypass\_eff}$ can be iteratively calculated and a digital filter can be applied (320). One embodiment of a digital filter comprises a Kalman filter. The following terms are calculated and defined for the Kalman filter.

$$y = \dot{M}_{dpf\_bypass},$$

$$x = A_{dpf\_bypass\_eff},$$

$$H\sqrt{2\rho_{exh}\Delta P_{clean}}$$

Values can be predicted for the terms, as follows.

$$\hat{x}_{k|k-1} = \hat{x}_{k-1},$$

$$\hat{y}_{k|k-1} = H_k \hat{x}_{k|k-1},$$

$$P_{k|k-1} = P_{k-1} + Q_k$$

New, filtered values for each of the terms can be determined as follows.

$$K_k = P_{k|k-1} H_k^T (H_k P_{k|k-1} H_k^T + R_k)^{-1},$$

$$P_k = (I - K_k H_k) P_{k|k-1},$$

$$\hat{x}_k = \hat{x}_{k|k-1} + K_k(y_k - \hat{y}_{k|k-1})$$

wherein $\hat{x}_k$ comprises the filtered value for the equivalent bypass area $A_{dpf\_bypass\_eff\_filtered}$. The filtered value for the equivalent bypass area, $A_{dpf\_bypass\_eff\_filtered}$, can be compared to the threshold bypass area, $A_{dpf\_bypass\_threshold}$, and a fault can be identified when the threshold is exceeded.

The equivalent bypass area $A_{dpf\_bypass\_eff\_filtered}$ comprises a measure of the mass of exhaust gas that does not flow through the porous walls of the substrate 60 of the particulate filter 70. When the substrate 60 of the particulate filter 70 is intact and the insulative support material 52 that wraps around the substrate 60 and mechanically secures the substrate 60 within the metallic container 51 is intact, the mass of exhaust gas that does not flow through the porous walls of the substrate 60 of the particulate filter 70 is minimal. Preferably substantially all the mass of exhaust gas flows through the porous walls of the substrate 60. When a fault occurs that affects integrity of the particulate filter 70, a portion of the mass of exhaust gas flowing into the particulate filter 70 may avoid passing through the porous walls of the substrate 60, instead passing elsewhere. A fault affecting integrity of the particulate filter 70 can include a fracture in a portion of the substrate 60, erosion or another degradation of the support material 52, and a mechanical leak in the metallic container 51. When no fault is detected, operation continues (350).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to monitor a particulate filter having an inlet, an outlet, and a substrate having porous walls disposed intermediate the inlet and the outlet, wherein a control module performs the following steps comprising:
    determining a mass flowrate of an exhaust gas feedstream flowing to the particulate filter;
    determining a mass flowrate of the exhaust gas feedstream flowing through the porous walls of the substrate subsequent to executing a regenerative operation to purge the substrate;
    determining an equivalent bypass area corresponding to a difference between the mass flowrate of the exhaust gas feedstream flowing to the particulate filter and the mass flowrate of the exhaust gas feedstream flowing through the porous walls of the substrate;
    comparing the equivalent bypass area to a threshold bypass area; and
    detecting a fault when the equivalent bypass area exceeds the threshold bypass area and continuing operation when no fault is detected.

2. The method of claim 1, wherein determining a mass flowrate of the exhaust gas feedstream flowing through the porous walls of the substrate subsequent to executing a regenerative operation to purge the substrate comprises
    determining a pressure differential in the exhaust gas feedstream between the inlet and the outlet subsequent to executing the regenerative operation to purge the substrate;
    determining a temperature of the exhaust gas feedstream upstream of the particulate filter subsequent to executing the regenerative operation to purge the substrate; and
    determining the mass flowrate of the exhaust gas feedstream flowing through the porous walls of the substrate based on the pressure differential in the exhaust gas feedstream between the inlet and the outlet and the temperature of the exhaust gas feedstream upstream of the particulate filter.

3. The method of claim 1, wherein determining a mass flowrate of an exhaust gas feedstream flowing to the particulate filter comprises:
    measuring an intake air flow to an internal combustion engine generating the exhaust gas feedstream; and
    determining the mass flowrate of the exhaust gas feedstream flowing to the particulate filter based upon the intake air flow.

4. The method of claim 1, further comprising:
    iteratively determining the equivalent bypass area;
    digitally filtering the iteratively determined equivalent bypass area to determine a filtered equivalent bypass area; and
    comparing the filtered equivalent bypass area to the threshold bypass area.

5. The method of claim 1, comprising determining the mass flowrate of the exhaust gas feedstream flowing through the porous walls of the substrate in accordance with the following relationship:

$$\rho_{exh}\Delta P_{clean} = a\mu\left(1 + \frac{b}{k}\right)\dot{M}_{exh\_filtered} + c\dot{M}^2_{exh\_filtered}$$

wherein
    $\Delta P_{clean}$ is a pressure differential across the substrate subsequent to regenerating the substrate;
    $\dot{M}_{exh\_filtered}$ represents the mass flow rate of the exhaust gas feedstream through the porous walls of the substrate;
    $\rho_{exh}$ represents exhaust gas density;
    $\mu$ represents exhaust gas viscosity;
    k represents permeability of the porous walls of the substrate; and
    a, b and c represent scalar values.

6. A method to monitor integrity of a particulate filter having an inlet, an outlet, and a filtering substrate disposed intermediate the inlet and outlet, the filtering substrate having a multiplicity of alternately closed parallel flow passages having porous walls oriented parallel to an axis between the inlet and outlet, wherein a control module performs the following steps comprising:
- regenerating the particulate filter; and
- subsequent to the regeneration,
  - determining a mass flowrate of an exhaust gas feedstream flowing to the particulate filter;
  - determining a mass flowrate of the exhaust gas feedstream flowing through the porous walls of the filtering substrate;
  - determining an equivalent bypass area corresponding to a difference between the mass flowrate of the exhaust gas feedstream flowing to the particulate filter and the mass flowrate of the exhaust gas feedstream flowing through the porous walls of the filtering substrate;
- comparing the equivalent bypass area to a threshold bypass area; and
- detecting a fault when the equivalent bypass area exceeds the threshold bypass area and continuing operation when no fault is detected.

7. The method of claim 6, wherein determining a mass flowrate of the exhaust gas feedstream flowing through the porous walls of the filtering substrate comprises:
- monitoring a pressure differential across the particulate filter;
- determining a temperature of the exhaust gas feedstream upstream of the particulate filter; and
- determining the mass flowrate of the exhaust gas flowing through the porous walls of the filtering substrate based on the pressure differential across the particulate filter and the temperature of the exhaust gas feedstream upstream of the particulate filter.

8. The method of claim 6, wherein determining a mass flowrate of an exhaust gas feedstream flowing to the particulate filter comprises:
- measuring an intake air flow to an internal combustion engine generating the exhaust gas feedstream; and
- determining the mass flowrate of the exhaust gas feedstream flowing to the particulate filter based upon the intake air flow.

9. The method of claim 6, further comprising:
- iteratively determining the equivalent bypass area;
- digitally filtering the iteratively determined equivalent bypass area to determine a filtered equivalent bypass area; and
- comparing the filtered equivalent bypass area to the threshold bypass area.

10. The method of claim 6, comprising determining the mass flowrate of the exhaust gas feedstream flowing through the porous walls of the substrate in accordance with the following relationship:

$$\rho_{exh} \Delta P_{clean} = a\mu\left(1 + \frac{b}{k}\right)\dot{M}_{exh\_filtered} + c\dot{M}^2_{exh\_filtered}$$

wherein
- $\Delta P_{clean}$ is a pressure differential across the substrate subsequent to regenerating the substrate;
- $\dot{M}_{exh\_filtered}$ represents the mass flow rate of the exhaust gas feedstream through the porous walls of the substrate;
- $\rho_{exh}$ represents exhaust gas density;
- $\mu$ represents exhaust gas viscosity;
- k represents permeability of the porous walls of the substrate; and
- a, b and c represent scalar values.

11. A method to monitor a regenerated particulate filter including a substrate, said substrate configured to filter exhaust gas, wherein a control module performs the following steps comprising:
- determining a mass flowrate of exhaust gas flowing to the particulate filter;
- determining a temperature of the exhaust gas and a pressure differential across the particulate filter subsequent to executing a regenerative operation to purge the substrate;
- determining a mass flowrate of the exhaust gas flowing through the substrate corresponding to the temperature of the exhaust gas and the pressure differential across the particulate filter;
- determining an equivalent bypass area corresponding to a difference between the mass flowrate of the exhaust gas flowing to the particulate filter and the mass flowrate of the exhaust gas flowing through the substrate;
- comparing the equivalent bypass area to a threshold bypass area; and
- detecting a fault when the equivalent bypass area exceeds the threshold bypass area and continuing operation when no fault is detected.

12. The method of claim 11, further comprising:
- iteratively calculating the equivalent bypass area;
- applying a digital filter to the iteratively calculated equivalent bypass area to determine a filtered equivalent bypass area;
- comparing the filtered equivalent bypass area to the threshold bypass area; and
- detecting the fault when the filtered equivalent bypass area exceeds the threshold bypass area.

13. The method of claim 11, comprising determining the mass flowrate of the exhaust gas feedstream flowing through the porous walls of the substrate in accordance with the following relationship:

$$\rho_{exh} \Delta P_{clean} = a\mu\left(1 + \frac{b}{k}\right)\dot{M}_{exh\_filtered} + c\dot{M}^2_{exh\_filtered}$$

wherein
- $\Delta P_{clean}$ is a pressure differential across the substrate subsequent to regenerating the substrate;
- $\dot{M}_{exh\_filtered}$ represents the mass flow rate of the exhaust gas feedstream through the porous walls of the substrate;
- $\rho_{exh}$ represents exhaust gas density;
- $\mu$ represents exhaust gas viscosity;
- k represents permeability of the porous walls of the substrate; and
- a, b and c represent scalar values.

* * * * *